United States Patent [19]

Loughlin, Jr. et al.

[11] Patent Number: 5,028,190
[45] Date of Patent: Jul. 2, 1991

[54] SNAP-IN FLOATING SCREW-ANCHOR

[75] Inventors: Jerry F. Loughlin, Jr., St. Clair Shores; Daniel J. House, Jr., Dryden, both of Mich.

[73] Assignee: Chrysler Corporation, Highland Park, Mich.

[21] Appl. No.: 583,628

[22] Filed: Sep. 17, 1990

[51] Int. Cl.$^5$ .............................................. F16B 37/04
[52] U.S. Cl. ..................................... 411/182; 411/15; 411/913
[58] Field of Search .................. 411/55, 60, 182, 510, 411/508, 15, 427, 908, 913

[56] References Cited

U.S. PATENT DOCUMENTS

| 2,946,612 | 7/1960 | Ahlgren | 411/510 X |
|---|---|---|---|
| 3,038,747 | 6/1962 | Rapata | 411/913 X |
| 4,521,148 | 6/1985 | Tanaka | 411/908 X |
| 4,927,306 | 5/1990 | Sato | 411/182 |

FOREIGN PATENT DOCUMENTS

| 2499177 | 8/1982 | France | 411/182 |

Primary Examiner—Rodney M. Lindsey
Attorney, Agent, or Firm—Edward P. Barthel

[57] ABSTRACT

A vehicle plastic panel is mounted by means of a one-piece molded screw anchor on a substructure member in a bi-directional tolerance compensating manner. The screw anchor is adapted for snap-in capture in a substructure elongated rectangular aperture enabling it to slide along the aperture major axis. Upon the insertion of a self-tapping screw in a panel circular opening overlying the screw anchor, the screw tip enters the anchor upper lead-in chamber. If the screw and anchor are misaligned, the screw tip contacts a subjacent one of a pair of opposed anchor ramped side surface portions whereby the anchor is cammed for limited adjustment along the aperture major axis. The anchor ramped surface portions terminate in a lower, elongated channel extending transverse to the major axis. The anchor base wall is adapted to be threadably engaged upon driving the screw at a piercing point in vertical alignment with the panel opening.

5 Claims, 2 Drawing Sheets

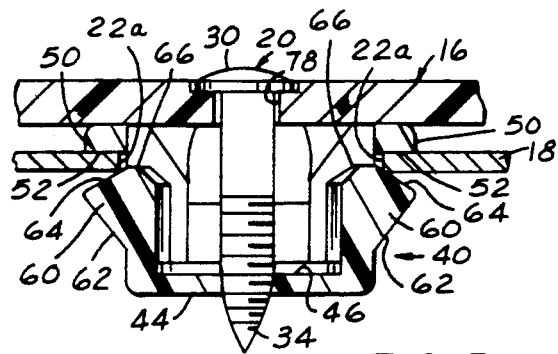
FIG. 5
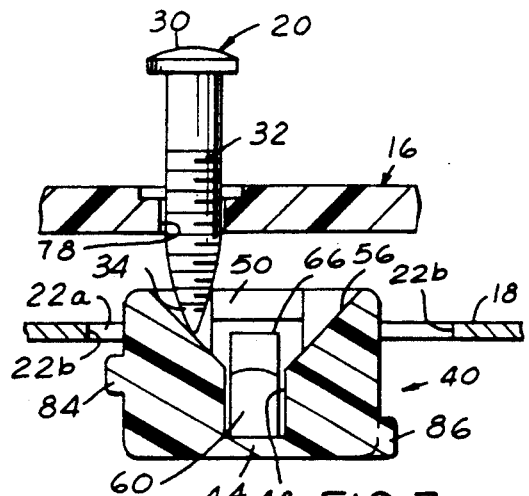
FIG. 7
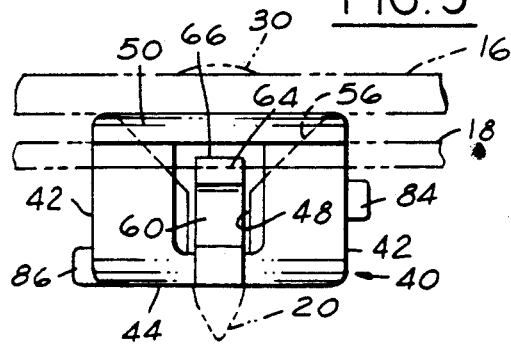
FIG. 6
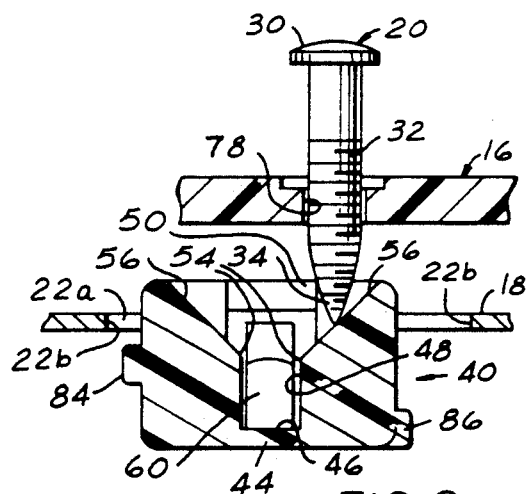
FIG. 8
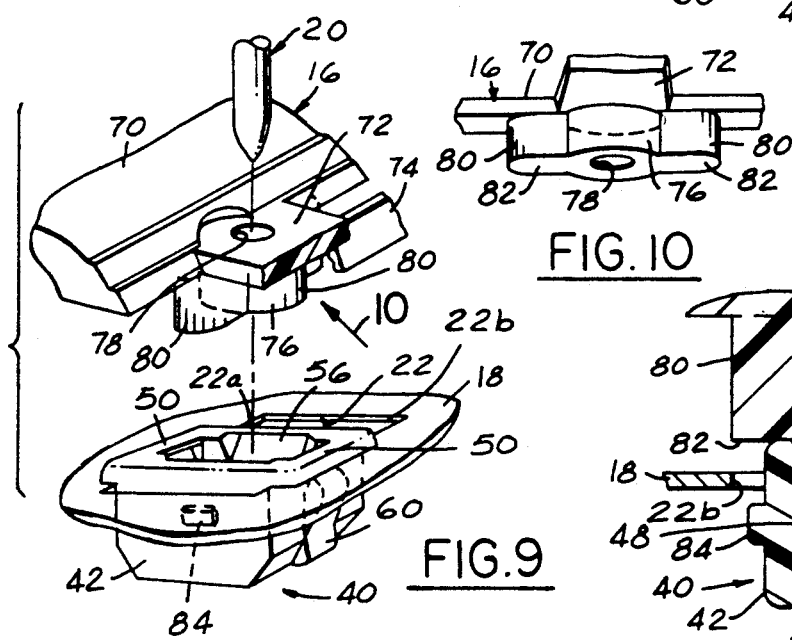
FIG. 9
FIG. 10
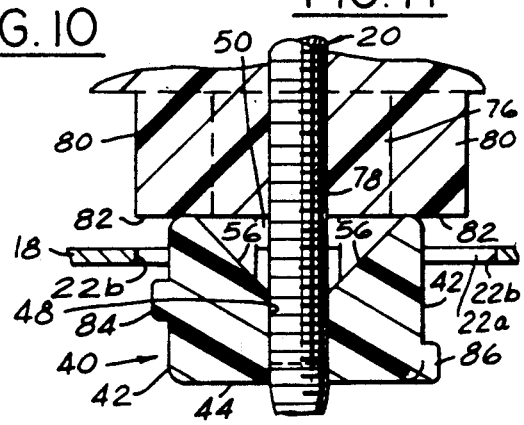
FIG. 11

SNAP-IN FLOATING SCREW-ANCHOR

BACKGROUND OF THE INVENTION

This invention relates generally to a retaining means for attaching a panel to a vehicle and, more particularly, to an improved snap-in floating screw-anchor arrangement with tolerance compensation for releasably retaining the panel on the body substructure.

The prior art is replete with various designs of screw anchors or grommets. The U.S. Pat. No. 2,836,214 issued May 27, 1958 to Rapata and U.S. Pat. No. 4,927,306 issued May 22, 1990 are examples of plastic screw anchors for insertion in mounting panels.

SUMMARY OF THE INVENTION

Accordingly, it is an object of the present invention to provide a novel and improved mounting arrangement to simply and reliably secure a panel on a vehicle substructure that is economic to produce and requires a minimum of labor to install.

Another object of this invention is to provide a novel low cost mounting arrangement employing a one-piece plastic screw anchor adapted for limited self-aligning adjustment in an elongated rectangular aperture of a vehicle body substructure member so as to secure an overlying plastic panel by self-tapping screws in a blind driving manner.

Still another object of the present invention is to provide a screw anchor mounting arrangement for securing a vehicle plastic panel in a tolerance compensating manner to a vehicle body substructure metal sheet while accommodating thermal growth of the plastic panel.

A vehicle plastic panel, such as a vent grille or the like, is removably mounted by means of a plurality of plastic screw anchors. Each anchor is a basket-like member having a generally rectangular shape with a pair of longitudinally extending transversely spaced side walls projecting upwardly from a central base wall. The anchor is adapted, by means of a pair of resilient locking prongs, for snap-in capture in an elongated rectangular aperture enabling it to slide freely along the major axis of the aperture.

Upon the insertion of a self-tapping screw in a panel circular opening overlying the anchor the screw cone-shaped tip is depressed so that its tip enters an upper lead-in chamber formed in the anchor. If the screw and anchor are off-center the screw tip contacts a subjacent one of a pair of opposed ramped downwardly and inwardly converging side wall opposed surfaces. As a result, the anchor slips in a wedge or cam-like manner providing adjustable travel along the aperture major axis. The anchor upper lead-in chamber terminates in a lower elongated channel, extending normal to the major axis, and defined by the co-extensive base wall and channel opposed side surfaces. The channel base wall provides a series of aligned tolerance compensating set points for ready blind driving of the screw. The screw is sized to threadably engage the channel side surfaces whereby the anchor positively retains the panel while accommodating thermal growth thereof.

BRIEF DESCRIPTION OF THE DRAWINGS

Other features and advantages of the invention, such as reduced number of parts and improved service disassembly, will be evident from the following detailed description of the preferred embodiment of the invention and the accompanying drawings wherein:

FIG. 5 is a fragmentary vertical sectional view taken on the line 5—5 of FIG. 3;

FIG. 6 is detail end elevational view of the screw anchor looking in the direction of arrow "6" of FIG. 3 with parts shown in phantom;

FIG. 7 is a fragmentary sectional view similar to FIG. 4 showing one self-centering operation;

FIG. 8 is a fragmentary sectional view similar to FIG. 7 showing an opposite self-centering operation;

FIG. 9 is a fragmentary exploded perspective view of a second installation arrangement of the screw anchor attaching arrangement of the present invention;

FIG. 10 is a fragmentary underside detail perspective view looking in the direction of arrow "10" of the second installation arrangement of FIG. 9; and FIG. 11 is a fragmentary vertical sectional view, similar to FIG. 4, of the second installation arrangement shown in FIGS. 9 and 10.

DETAILED DESCRIPTION OF THE PREFERRED EMBODIMENT

Figure 1:
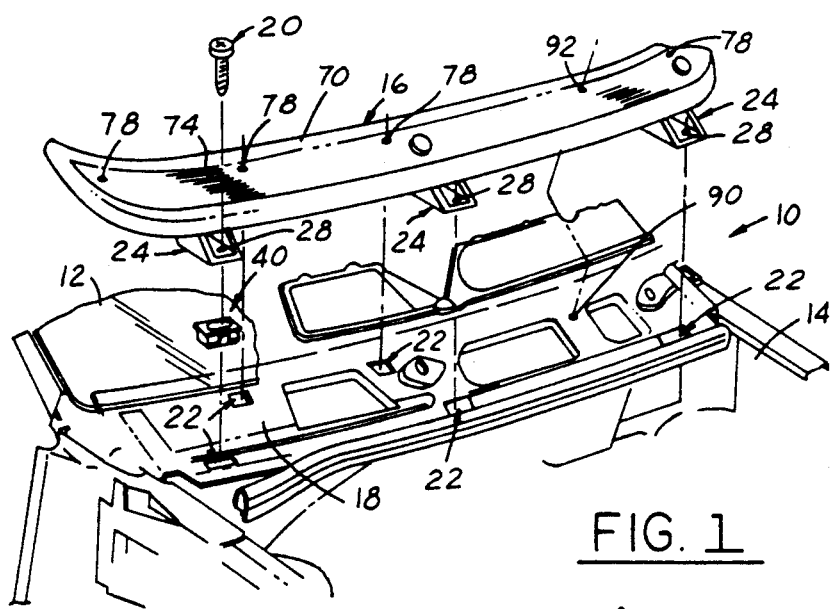
FIG. 1 is a fragmentary exploded perspective view of a vehicle having a louvered vent grille.

Referring now to FIG. 1 of the drawings there is shown a fragmentary exploded perspective view of a vehicle 10 including a windshield 12, an engine compartment 14 adapted to be covered by a hood (not shown). The rearward end of the hood is adapted to be spaced forwardly of the windshield 12 and an integrally molded one-piece plastic shroud top vent grille or panel 16. The grille front edge is disposed adjacent the rearward end of the hood while the grille rear edge rests on the forward periphery of the windshield 12. The plastic panel 16 is adapted to be releasably secured to the vehicle body substructure such as metal substructure sheet shown at 18. In the instant invention the plastic panel 16 is adapted to be secured by threaded fasteners in the form of self-drilling or self-tapping screws one of which is shown at 20.

Figure 2:
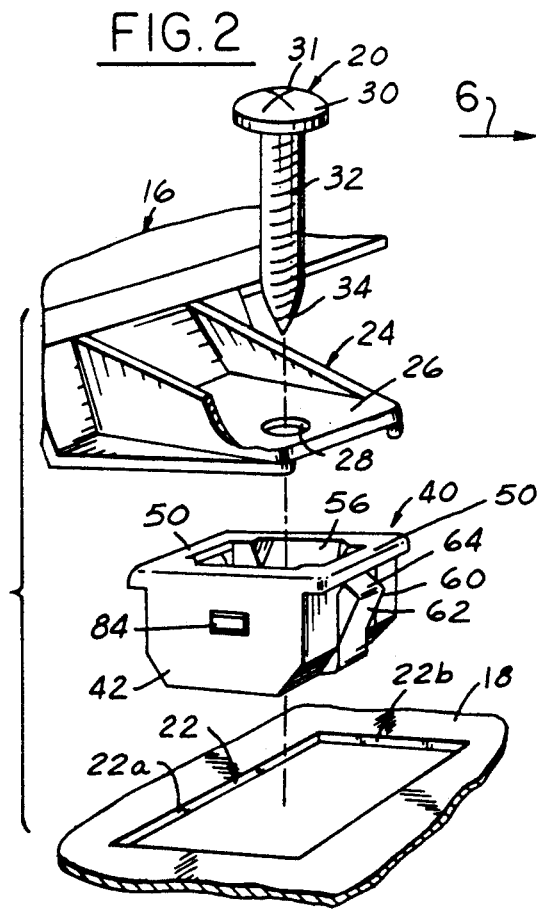
FIG. 2 is a fragmentary exploded perspective view of one installation for an improved screw anchor attaching arrangement of the present invention.

With reference to FIGS. 1 and 2 it will be seen that the metal substructure sheet 18 is provided with plurality of elongated transversely extending rectangular apertures indicated generally at 22. It will be noted in FIG. 2 that the apertures 22 are defined by parallel transversely disposed side edges 22a and longitudinally disposed end edges 24b. The plastic panel 16 is integrally molded with three forwardly directed extensions 24 each formed with a planar foot portion, shown at 26 in FIG. 2, provided with a circular opening or hole 28 adapted to receive an associated screw 20. Each screw 20 comprises a head 30, preferably having a cross-point or Phillips type driver recess 31, and a shank with self-tapping thread 32 terminating in a pointed tip 34.

Figure 3:
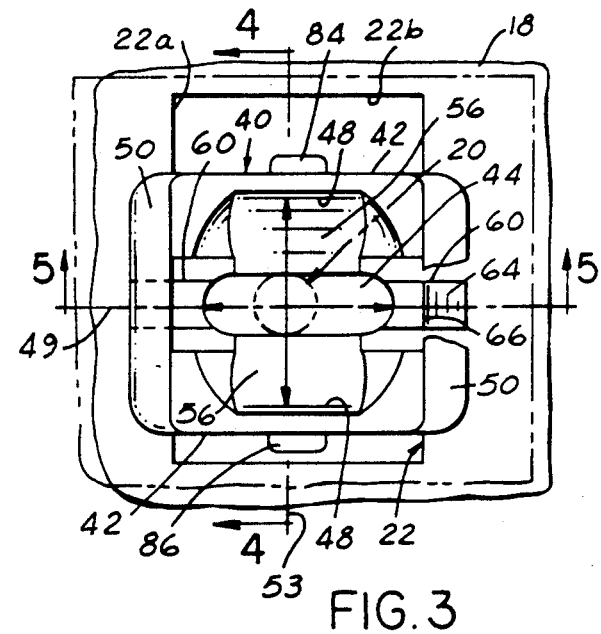
FIG. 3 is an enlarged top elevational view, with parts broken away, of the screw anchor installation of FIG. 2 of the present invention.
Figure 4:
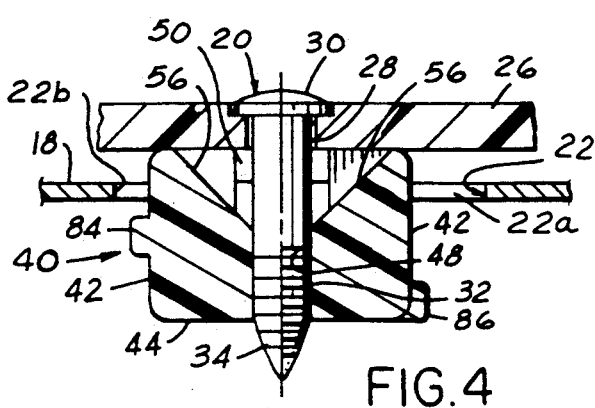
FIG. 4 is a fragmentary vertical sectional view of the vehicle panel mounting installation taken on the line 4—4 of FIG. 3.

Turning now to the screw anchor of the present invention each substructure sheet aperture 22 is adapted to receive an improved one-piece snap-in screw anchor, generally indicated at 40, molded from a suitable resilient plastic material. As best seen in FIGS. 3, 4, and 5 each screw anchor 40 is generally in the configuration of a "basket" of rectangular shape. The anchor is formed with first and second longitudinally extending transversely spaced mirror image block-like side walls 42. The side walls project upwardly from a horizontally disposed elongated base wall 44 which interconnects the side walls and form therewith a lower U-sectioned longitudinally extending open-ended central channel. The central channel is defined by base wall upper surface portion 46 in combination with opposed vertically extending side wall lower surface portions 48. The pair of side walls 42 are disposed parallel to and on opposite sides of a transversely extending vertically disposed plane of symmetry of the anchor which plane includes the neutral axis of the base wall indicated by dashed section line 49 in FIG. 3.

FIG. 2 shows a pair of first and second transversely extending beam-like runners 50 integrally connected at each end thereof atop respective opposed end portions the pair of side walls 42. The runners 50 bridge the spaced side walls so as to define with the base wall 44 and side walls 42 a rectangular window at each longitudinal end of the base wall. The runners 50 project or overhang laterally outwardly from their respective side wall end portions providing a pair of opposite downwardly facing shoulders 52 as seen in FIG. 5. The shoulders 52 are adapted for sliding contact along aperture major axis 53 (FIG. 3) with respective underlying side border portions of the substructure sheet aperture side edges 22a.

FIGS. 7 and 8 depict each of the channel opposed side surface portions 48 terminating at a horizontally disposed transition juncture 54 with an associated upper sloped ramp surface portion 56 defining an upper elongated screw entrance to the channel. Each of the ramp surface portions 56 diverge in an upward and outward manner from the channel entrance defining with the pair of runners 50 an anchor upper lead-in chamber enabling blind reception of the screw tip 34 therein.

As best seen in FIGS. 3 and 5 a pair of resilient mirror image locking prongs 60 extend upwardly from the base wall 44 at each end thereof. Each of the prongs 60 has an outside lower engaging portion in the form of oblique edge surface 62 directed upwardly and outwardly through an associated one of the channel end windows. Further, each of the prongs 60 has an outside upper locking portion in the form of oblique edge surface 64 directed upwardly and inwardly to an upper terminus 66 spaced a predetermined dimension below its associated runner shoulder 52. Upon an anchor 40 being inserted and pushed downwardly in its aperture 22 each of the opposed pair of prongs 60 are adapted be resiliently depressed inwardly by an associated sheet aperture side edge 22a contacting a respective prong lower oblique edge surface 62.

With further insertion, the prongs 60 clear the aperture for snap-in locking capture by each prong upper oblique edge surface 64 engaging its associated side edge 22a. Thus, the anchor's locking capture results in each aperture side edge 22a retained between an associated runner shoulder 52 and its opposed subjacent prong upper oblique edge surface 64. The anchor 40 is thus adapted for limited sliding movement transversely to the vehicle longitudinal centerline, i.e., along the major axis 53 of its associated sheet aperture 22. It will be noted in FIG. 5 that the rectangular aperture side edges 22a are spaced a predetermined distance to engage their associated prong lower oblique edge surface 62.

As seen in FIG. 7 with each anchor 40 installed in its associated substructure sheet aperture 22 the overlying plastic panel 16 is positioned thereabove with a screw 20 inserted in a respective panel circular opening 28 or 78 without threaded engagement therebetween. The application of an initial downward force on the screw head 30 causes its screw tip 34 to enter the anchor lead-in chamber. In the event that the anchor and the screw tip 34 are transversely misaligned along the aperture major axis 53 the tip is adapted to contact a respective subjacent one of the anchor ramp surfaces 56.

Continued downward travel of the tip 34 on the one ramp surface results in the anchor 40 being progressively cammed for travel in the aperture 22 along major axis 53 in a first tolerance compensating manner. Upon the screw 20 being received in the anchor channel it will be seen in FIG. 3 that its shank 32 principal axis is guided into coincidence with the anchor vertical plane of symmetry which includes its neutral axis 49. Subsequent driving rotation of the screw results in its self-tapping thread 32 lockingly engaging both side surfaces 48 of the channel with screw tip 34 penetrating the base wall 44 at a base wall piercing point on the neutral axis 49. The piercing point is thus self-aligned with the principal axis of its associated panel circular opening 28 or 78 as seen in FIGS. 4 and 11, respectively.

It will be noted in FIG. 4 that the panel forward planar foot portion 26 is adapted to be supported in flush manner on the upper surface of the anchor 40 in the first fastening arrangement. With reference to FIGS. 1, 9, and 10 it will be seen that adjacent the trailing edge of the vent grille panel 16 includes a transverse aft frame member 70 formed with a plurality of longitudinally extending bridging tabs 72. Each tab 72 has its fore and aft ends molded integral with the respective frame member 70 and rearmost louver 74, respectively, of the vent grille panel so as to span the space therebetween.

As seen in FIG. 10 an integral boss 76 is molded to depend from the underside of the tab 72 with the boss and the tab circular opening or hole 78 comprising a vertical smooth bore formed therethrough adapted to receive one of the screws 20 in an unthreaded manner. FIG. 10 shows the boss 76 formed with a pair of integral laterally projecting wings 80 having their bottom end surfaces 82 coextensive with the bottom end surface of the boss 76. By virtue of this construction, the wing bottom end surfaces 82 are supported on the anchor upper end in a flush horizontal manner upon driving the screw 20.

With reference to FIGS. 6, 9, and 11 it will be noted that one outer side surface of a side wall 42 is formed with a stop bump 84 at the center thereof while the other side wall outer side surface is formed with a symmetrically disposed stop bump 86 adjacent its lower edge. The stop bumps 84 and 86 function as installation stops to insure the installer correctly orientates of the anchor 40 in an associated substructure sheet elongated aperture 22. If the anchor is mistakenly rotated in a horizontal plane ninety degrees from its correct orientation (shown in FIG. 3 of the drawings), the stop bumps 84 and 86 are arranged and sized to each engage an associated rectangular aperture side edge 22a thereby preventing incorrect orientation of the anchor.

As seen in FIG. 1, the substructure metal sheet 18 has a plurality of transversely elongated apertures 22 for receiving a screw anchor 40. The disclosed embodiment shows three apertures 22 at the loading edge of sheet 18 for receiving screws 20 inserted in each hole 28 of the three extensions 24. The panel 16 has four holes 78, each adapted to receive a screw 20 for engaging an anchor 40 in an aperture 22 adjacent the windshield 12. The two outboard apertures 22 for outboard holes 78 are not shown.

The panel 18 is initially assembled by a selftapping screw 20 in panel opening 92 being driven at the one self-drilled hole 90 thereby anchoring the panel 16 at one point on the metal substructure sheet 18. Next, the panel 16 is secured by a screw 20 inserted in each of the holes 28 and 78 and driven in a blind self-tapping manner into an underlying anchor 40 captured in its associated aperture 22. The plastic panel 16 is thus allowed to thermally expand and contract in its lengthwise direction, transverse to the vehicle longitudinal axis, from its single anchored selfdrilled hole 90. Such thermal expansion and contraction occurs by virtue of each anchor 40 being adapted for limited transverse travel along its aperture major axis 53.

While there is described above the principles of this invention in connection with a specific embodiment, it is to be clearly understood that this description is made only by way of example and not as a limitation to the scope of this invention.

What is claimed is:

1. A one-piece screw anchor molded of plastic material adapted for snapped-in capture in a rectangular aperture elongated in the direction of its major axis and formed in a substructure sheet member of a vehicle body, said anchor applied from one upper face of said substructure member with the aperture having opposed side edges, said anchor adapted to receive an associated self-tapping screw having a threaded shank and a pointed tip, said shank extending through a circular opening formed in an overlying panel with said panel adapted to be secured relative to said substructure member, said one-piece screw anchor comprising:

a basket-like screw anchor of generally rectangular shape having first and second longitudinally extending transversely spaced mirror image side walls projecting upwardly from a horizontally disposed elongated base wall, said side walls arranged parallel to and on opposite sides of a longitudinally extending vertically disposed plane of symmetry that includes the base wall longitudinal neutral axis thereof, said side walls having two opposed inner vertically disposed lower side surface portions defining with said base wall a longitudinally extending U-sectioned central channel;

first and second transversely beam-like runners connected to each end thereof atop respective opposed end portions of said anchor first and second spaced side walls, said runners bridging said spaced side walls and defining with said base wall and said side walls a central window at each longitudinal end of said base wall, said runners projecting laterally outwardly from their respective side wall end portions providing a pair of opposite downwardly facing overhanging shoulders adapted for sliding contact with respective border portions of said rectangular aperture side edges thereof;

each said channel opposed lower side surface portion terminating at an intermediate horizontal transition juncture with an associated upper sloped ramp surface portion whereby the pair of junctures defining an entrance to said channel, each said ramp surface portion diverging in an upward and outward manner from its associated channel entrance juncture such that said ramp surface portions defining with said pair of beam-like runners an anchor upper lead-in chamber;

a pair of opposed resilient mirror image prongs, each prong extending upwardly from said base wall at one end thereof, whereby an engaging portion of each said prong projects outwardly through an associated one of said windows;

said aperture opposed side edges spaced a predetermined distance apart such that each side prong engaging portion adapted to be resiliently depressed inwardly by an associated aperture side edge upon downward pressure being exerted on said screw anchor for snap-in capture of said anchor in said aperture;

the capture of said screw anchor resulting in each said aperture side edge being retained between a runner overhanging shoulder and an associated prong locking portion spaced a predetermined dimension below its associated shoulder enabling limited sliding travel of said anchor along said rectangular aperture major axis;

whereby upon initial downward insertion of said screw through said overlying panel circular opening in a non-rotating manner allows said screw pointed tip to enter said upper lead-in chamber, and in the event that said screw anchor channel entrance and said tip are not aligned, said tip contacts a respective subjacent one of said upper ramp surface portions, such that continued downward travel of said tip on said one ramp surface portion causes said screw anchor to be progressively cammed for travel in said aperture in a first tolerance compensating direction along said base wall neutral axis until said tip is received in said channel entrance and contacts said base wall, thereby locating said tip at a piercing point on said base wall neutral axis; and whereby upon subsequent driving of said screw in a self-tapping manner said tip threadably penetrates said base wall at said piercing point intermediate said pair of prongs in a second tolerance compensating direction transverse to said rectangular aperture major axis retaining said panel on said substructure member.

2. The one-piece screw anchor as set forth in claim 1, whereby said shank thread drivingly engages both said channel lower side surface portions.

3. The one-piece screw anchor as set forth in claim 1, wherein each said prong engaging portion having a lower oblique edge surface directed upwardly and outwardly through an associated one of said windows, and each said prong locking portion having an upper oblique edge surface directed upwardly and inwardly.

4. The one-piece screw anchor as set forth in claim 1, wherein each side wall outer surface is formed with a stop bump projecting normally therefrom, said stop bumps insuring said screw anchor being oriented with each said locking prong engaging portion being engaged by an associated rectangular aperture side edge prior to snap-in capture of said screw anchor in said rectangular aperture.

5. The one-piece screw anchor as set forth in claim 1, wherein said substructure member being a sheet metal member and having a plurality of said rectangular apertures formed therein, each said rectangular aperture having one of a plurality of said screw anchors captured in an associated one said rectangular apertures and wherein each said rectangular aperture having its major axis extending in a common direction; and said panel being formed of plastic material and being initially secured to said substructure sheet metal member at a single anchored point, said plastic panel having a plurality of circular openings formed therein in a predetermined pattern such that a circular opening overlies each said rectangular aperture, whereby upon one of said screws being inserted in each said circular opening and driven into threaded engagement with its associated screw anchor, each said screw anchor movable along its associated rectangular aperture major axis to accommodate limited thermal expansion and contraction of said panel relative to said substructure sheet metal member in said common direction.

* * * * *